United States Patent [19]

McCunn

[11] 4,433,532
[45] Feb. 28, 1984

[54] LAWN MOWER BAGGING SYSTEM INCLUDING AIR ASSIST

[75] Inventor: Myron L. McCunn, Orion, Ill.

[73] Assignee: Deere & Company, Moline, Ill.

[21] Appl. No.: 403,176

[22] Filed: Jul. 29, 1982

[51] Int. Cl.³ .................................................. A01D 35/22
[52] U.S. Cl. ....................................... 56/320.2; 56/16.6; 56/202
[58] Field of Search ........................ 56/13.3, 16.6, 202, 56/320.2

[56] References Cited

U.S. PATENT DOCUMENTS 3,708,968  1/1973  Enters et al. ................ 56/320.2
4,095,398  6/1978  Aumann et al. ............... 56/16.6
4,193,249  3/1980  Tackett ....................... 56/11.9

FOREIGN PATENT DOCUMENTS 31158  7/1981  European Pat. Off. .......... 56/320.2

Primary Examiner—Jay N. Eskovitz

[57] ABSTRACT

A bagging lawn mower includes a mower blade housing having a discharge outlet, and a material-conveying duct has one end connected for receiving material from the housing and another end connected for depositing conveyed material into the top of a receptacle. The conveyance of material through the duct is assisted by a blower having an inlet coupled for drawing air in from the receptacle and having an outlet coupled to an air duct having an outlet nozzle located in the material-conveying duct at a location just upstream from the housing outlet and operative to cause a vacuum to be created which effects the induction of air from the housing.

5 Claims, 2 Drawing Figures

LAWN MOWER BAGGING SYSTEM INCLUDING AIR ASSIST

BACKGROUND OF THE INVENTION

The present invention relates to a bagging system adapted for attachment to a lawn mower for the purpose of directing clippings from the mower to a bag or other receptacle, and more specifically relates to such systems as include an assist for aiding in the conveyance of the clippings.

It is well known to provide lawn mowers with clipping collectors including ductwork which carry the clippings from the mower housing discharge opening to a receptacle carried by the mower. In order to assist the mower blade or blades in effecting movement of the clippings through the ductwork, it is known to provide blower impellers mounted in the ductwork, as disclosed, for example, in U.S. Pat. No. 4,193,249, which issued to Tackett on Mar. 18, 1980, such that the clippings are drawn into and discharged by the blower blades. Another assist blower position is disclosed in U.S. Pat. No. 4,095,398 which issued to Aumann et al on June 20, 1978 and shows the blower arranged so as to create a vacuum in the collection receptacle.

The first of these blower-assisted arrangements suffers from the disadvantage of undue power consumption and wear due to the fact that the blades must "handle" the clippings. The second of the arrangements suffers from the disadvantage that the vacuum is created in an area somewhat remote from the mower discharge opening which necessitates a relatively large blower unit in order for the vacuum to be effective in drawing material through the ductwork.

SUMMARY OF THE INVENTION

According to the present invention, there is provided a novel bagging attachment for a lawn mower and more specifically, there is provided such an attachment which employs an assist device.

A broad object of the invention is to provide a lawn mower bagging attachment which is simple in construction and effective, efficient, clean and quiet in operation.

More specifically it is an object of the invention to provide a bagging attachment having a substantially closed system air assist for aiding in the conveyance of material from the mower discharge outlet to a material collecting receptacle and for aiding in compacting the collected material.

Yet another object of the invention is to provide a bagging attachment including a blower mounted within the material collecting receptacle and having an inlet arranged for drawing air in through material being collected and an outlet coupled to material-conveying ductwork at a location just downstream from the discharge outlet of the mower housing.

These and other objects will become apparent from a reading of the ensuing description together with the appended drawing.

DESCRIPTION OF THE PREFERRED EMBODIMENT

Figure 1:
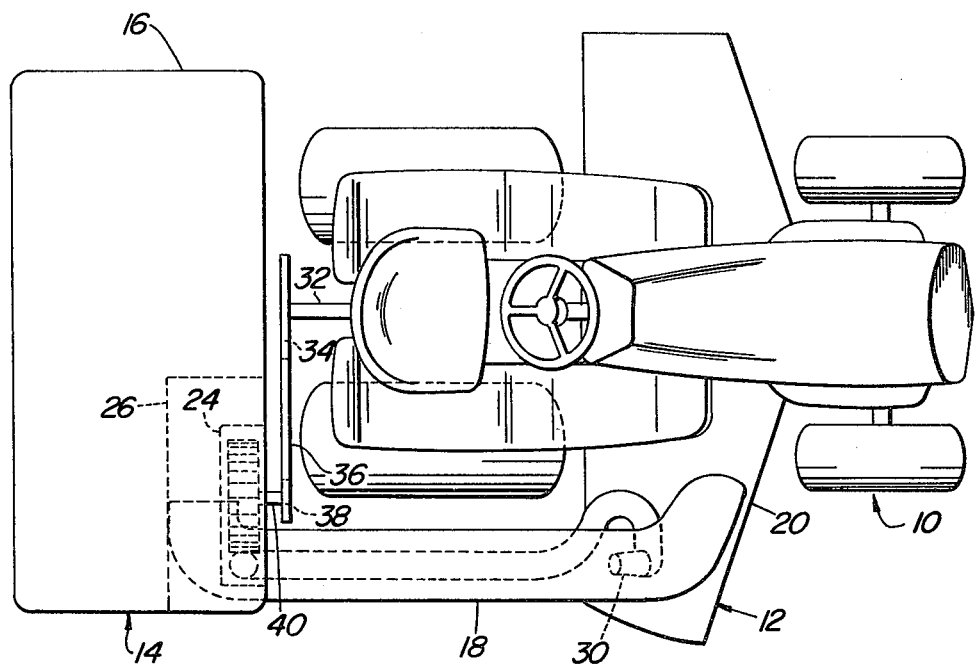
FIG. 1 is a top view of a tractor-mounted lawn mower embodying a bagging attachment constructed in accordance with the principles of the present invention.
Figure 2:
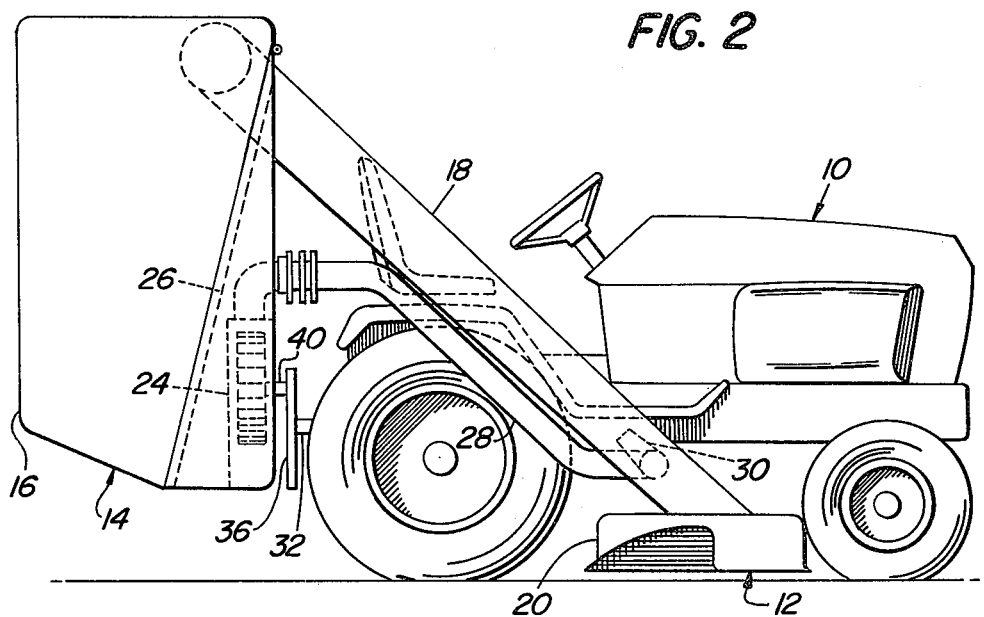
FIG. 2 is a right side view of the tractor-mounted lawn mower shown in FIG. 1.

Referring now to the drawing, there is shown a tractor 10 having a mower 12 suspended therebeneath and having a bagging attachment 14 supported thereon for receiving material discharged by the mower.

Specifically, the bagging attachment 14 comprises a receptacle 16 supported at the rear of the tractor and a duct 18 having one end supported over a discharge opening of a blade housing 20 of the mower and having another end received in an opening provided in an upper right front portion of the receptacle. The structure thus far described is quite conventional in that a blade or blades (not shown) of the mower not only perform a cutting function but also perform the function of effecting the movement of the cut material through the duct 18 to the receptacle 16.

The bagging attachment 14 additionally includes an air assist mechanism for enhancing the movement of material through the duct 18. Specifically, the air assist mechanism includes a blower 24 having an intake connected for drawing air in from the interior of the receptacle 16. A screen 26 is positioned within the receptacle so as to prevent the material being collected from being ingested by the blower. Connected to the outlet of the blower 24 is an air conveying tube 28 having a discharge nozzle 30 positioned in the duct 18 at a location just upstream from the discharge outlet of the mower blade housing. The air discharged through the nozzle 30 has a high velocity which creates a low pressure area or vacuum causing air to be induced from the blade housing 20. Since the induced air is carrying the material being discharged from the housing, the airborne material is then accelerated and delivered to the receptacle 16 after mixing with the high velocity air from the nozzle.

Power for driving the blower 24 is supplied by a power takeoff shaft 32 extending from the rear of the tractor and having a drive pulley 34 mounted thereon. A belt 36 couples the pulley 34 to driven pulley 38 provided on a drive shaft 40 of the blower.

The operation of the invention is thought to be evident from the foregoing description and for the sake of brevity is not reiterated here.

I claim:

1. In combination with a bagging lawn mower including a mower blade housing defining a discharge opening, an enclosed receptacle, and a material-conveying conduit having opposite ends respectively connected for receiving material from the discharge opening and depositing material into an upper portion of the receptacle, an air assist system comprising: a blower means having an inlet and an outlet; said inlet being connected to a lower area of the receptacle; screen means mounted in said receptacle for preventing material from being ingested by said blower means; and an air duct having one end connected in air-receiving relationship to said outlet and having another end communicating with said conduit at a location downstream from said discharge opening, with said last-mentioned end being in the form of a nozzle oriented to direct a stream of relatively high velocity air in the direction of said receptacle whereby an area of low pressure is caused for inducing air from the blade housing.

2. The lawn mower defined in claim 1 wherein the blower means is mounted in said lower area of the receptacle; and a screen means partitioning said lower area from a remaining portion of the receptacle.

3. The lawn mower defined in claim 2 wherein said screen partition means extends to a location adjacent to said upper portion of the receptacle.

4. A bagging lawn mower comprising: a mower blade housing having a discharge opening at one side thereof; a material-collecting receptacle having an inlet opening at an upper location thereof; a material-conveying duct connected between the discharge and inlet openings for conveying material from the housing to the receptacle; said duct being curved between a sidewise extending portion beginning at the discharge opening and a rearward extending portion beginning a short distance downstream therefrom so as to define a transition zone; an air assist system including a blower means having an inlet coupled to a lower area of said receptacle and having an outlet; an air-conveying duct connected to said outlet and having a discharge nozzle located in the transition zone of said material-conveying duct and directed toward said receptacle, whereby air discharged from the nozzle will effect a vacuum so as to induce air from the housing to assist the movement of material from the housing.

5. The bagging lawn mower defined in claim 4 wherein said blower means is a fan; said fan being supported within the receptacle; and screen means located in said receptacle for preventing material collected in the receptacle from being ingested by said fan.

* * * * *

UNITED STATES PATENT AND TRADEMARK OFFICE
CERTIFICATE OF CORRECTION

PATENT NO. : 4,433,532

DATED : 28 February 1984

INVENTOR(S) : Myron L. McCunn

It is certified that error appears in the above-identified patent and that said Letters Patent is hereby corrected as shown below:

Column 2, line 68, delete "said" and insert -- a --.

Column 3, line 1, delete "a" and insert -- said --; line 4, delete "partition".

Signed and Sealed this

Twelfth Day of June 1984

[SEAL]

Attest:

Attesting Officer

GERALD J. MOSSINGHOFF

Commissioner of Patents and Trademarks